Nov. 8, 1927.
T. PURDIE
1,648,566
CLIP FOR VEHICLE SPRINGS
Filed Feb. 3, 1927
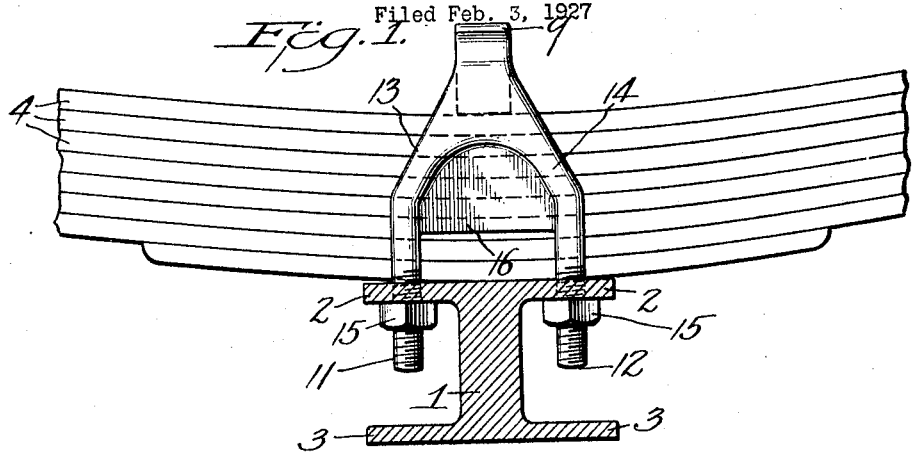
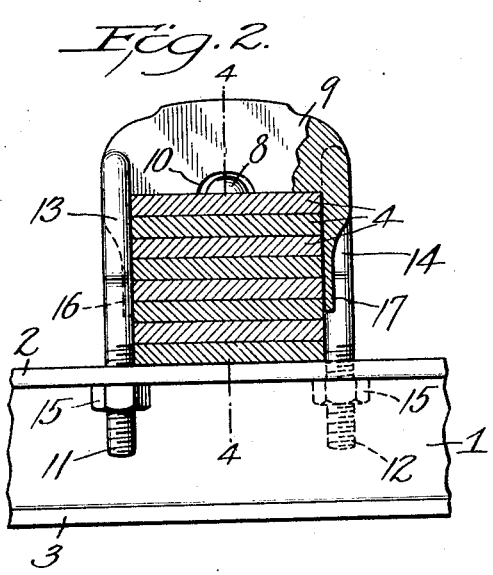
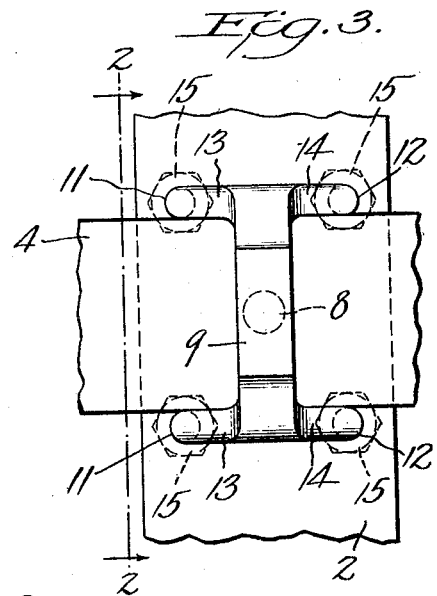
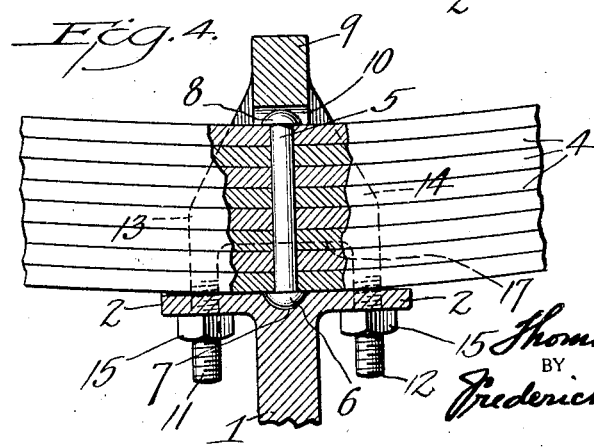
INVENTOR
Thomas Purdie
BY
Frederick W. Barker
ATTORNEY Patented Nov. 8, 1927.

1,648,566

UNITED STATES PATENT OFFICE.

THOMAS PURDIE, OF BROOKLYN, NEW YORK.

CLIP FOR VEHICLE SPRINGS.

Application filed February 3, 1927. Serial No. 165,531.

This invention relates to the means employed for attaching leaf springs to the axles of motor vehicles, and my improvement is directed to a form of clip which will securely bind all the laminæ of a spring to an axle in a single central vertical plane that is transverse to the spring and longitudinal with respect to the axle. Furthermore my improved clip device is characterized, in addition to having the single central bearing upon the spring, as being provided with two pairs of spaced pendent bolts for engagement with the opposite sides of the axle, each pair of bolts being connected by an intermediate vertical web lying against the opposite side edges of the spring laminæ, to afford walls that reinforce the clip structure and prevent lateral motion of the spring.

Usually leaf springs are connected to the axles of motor vehicles by pairs of clips that are in spaced relation at opposite sides of the centre bolt, this arrangement resulting in a slackening of the connection with flexure of the springs, whereby shearing strains are exerted by the laminæ upon the centre bolt, breaking of the bolt sometimes resulting; and it is this condition among others that my invention is intended to remedy by the provision of a powerfully clamped clip uniting the spring to the axle with only a centre bearing upon the spring where no flexing of its laminæ occurs.

Other features and advantages of my invention will hereinafter appear.

In the drawing:—

Figure 1 is a side elevation of a leaf spring provided with my improved clip uniting it to an axle that is here shown in cross-section.

Figure 2 is a cross-sectional view through the spring showing the clip partly in section; taken on the line 2—2 of Figure 3.

Figure 3 is a top plan view, and

Figure 4 is a side view partly in section on the line 4—4 of Figure 2.

In the drawing, by way of example only, I have shown a motor vehicle axle of I beam construction, having the web 1, upper flanges 2 and lower flanges 3. An elliptical leaf spring composed of laminæ 4 is shown as imposed upon the axle and as provided with a connecting centre bolt 5, whose lower head 6 fits in a recess 7 provided therefor in the axle and whose upper head 8 projects above the upper surface of the top leaf of the spring.

My improved clip is composed of the upper, bridge-like portion or bar 9 which is adapted to lie across the spring in contact with the topmost leaf thereof, over the centre bolt, a recess 10 in the under surface of bar 9 being provided for the reception of bolt head 8; said bar 9 having two pairs 11, 12 of pendent bolts that extend from pairs of bolt portions 13, 14 which are respectively in convergent, connective relation with the ends of bar 9. By this structural arrangement the members of each pair of bolts 11, 12 are disposed in spaced parallelism, the bolts of the pair 11 straddling the spring at one side of the centre bolt, and the bolts of the pair 12 straddling the spring at the other side of the centre bolt. It will be understood that the spacing between the bolts of each pair is gauged to admit the width of the spring between them, with no more intermediate slack than is necessary to permit the slight flexing of the spring laminæ which occurs in the working thereof. Also it will be understood that the spacing of opposed members of the respective pairs of bolts is sufficient to enable a stable and secure, four point attachment to be effected between the bolts and the axle. With the form of I beam axle herein illustrated the pair of bolts 11 penetrate the axle flange 2 at one side of web 1 and the pair of bolts 12 penetrate the axle flange 2 at the other side of said web, the bolts being secured and the bar 9 drawn tightly and firmly against the spring by means of nuts 15.

Reinforcing webs 16, 17 included in the clip structure span the spaces respectively between opposed bolts of the pairs 11, 12 and between the opposed convergent bolt portions 13, 14, these webs lying flush with the inner surfaces of opposed bolts and convergent bolt portions of the respective pairs to provide continuous walls that respectively embrace the sides of the spring. These webs or walls 16, 17 largely increase the strength and rigidity of the shackle structure, enabling it to withstand the lateral strains to which it is subjected in the working of the spring, besides preventing deformation of the bolts and permitting the powerful clip grip that binds the spring to the axle in one vertical, central, transverse plane to be maintained under all conditions of service.

Variations within the spirit and scope of my invention are equally comprehended by the foregoing disclosure.

I claim:

1. A clip for uniting leaf springs to axles comprising a bridge portion of relatively narrow width to lie contactingly across the spring in the vertical, central, longitudinal plane of its supporting axle, and two pairs of bolts having converging upper portions that connect with said bridge portion, said bolts depending, in spaced relation, therefrom, each pair of bolts closely straddling the spring and connecting with the axle at opposite sides of said central plane.

2. A clip for uniting leaf springs to axles comprising a bridge portion of relatively narrow width to lie contactingly across the spring in the vertical, central, longitudinal plane of its supporting axle, two pairs of bolts having converging upper portions that connect with said bridge portion, said bolts depending, in spaced relation, therefrom, each pair of bolts closely straddling the spring and connecting with the axle at opposite sides of said central plane, and webs between opposed bolts of the pairs thereof to reinforce the shackle structure.

New York, January 31st, 1927.

THOMAS PURDIE.